United States Patent

Mohn et al.

[15] 3,685,266

[45] Aug. 22, 1972

[54] HARVESTING MACHINE

[72] Inventors: Donald R. Mohn; Herbert D. Mohn, both of Rt. 3, Box 401, Troutdale, Oreg. 97060

[22] Filed: May 27, 1970

[21] Appl. No.: 40,845

[52] U.S. Cl. ..............................................56/330
[51] Int. Cl. ...........................................A01g 19/00
[58] Field of Search.........................56/328–330

[56] References Cited

UNITED STATES PATENTS

| | | | |
|---|---|---|---|
| 3,538,694 | 11/1970 | Holloway | 56/330 |
| 3,449,895 | 6/1969 | Pertics | 56/330 |
| 3,553,949 | 1/1971 | Rauth | 56/329 |
| 3,165,879 | 1/1965 | Chapin | 56/330 |

FOREIGN PATENTS OR APPLICATIONS

| | | | |
|---|---|---|---|
| 233,342 | 4/1969 | U.S.S.R. | 56/330 |

*Primary Examiner*—Robert Peshock
*Assistant Examiner*—J. A. Oliff
*Attorney*—Eugene M. Eckelman

[57] ABSTRACT

A harvesting machine having wheeled support and arranged to move in straddling relation along a row of vines. The center of the machine for receiving the row of vines is defined by a pair of rub bars, and flexible fingers in continuous relation are disposed in opposed relation for encompassing the stems of vines to receive crop removed from the vines by shaker mechanism. Laterally movable conveyors are provided for receiving the crop from the flexible fingers and such conveyors move the crop onto longitudinally movable conveyors. Forced air means are provided in connection with the laterally movable conveyor to blow out foreign particles. The pickup finger mechanism has travelling support on the machine so as to be driven in reverse at the same speed that the machine is travelling forward so that the fingers do not slide past the vines. Means are provided for regulating the speed of the shaker mechanism as well as the angular disposition thereof and the length of travel of the shakers.

20 Claims, 14 Drawing Figures

DONALD R. MOHN
HERBERT D. MOHN
INVENTORS.
BY Eugene M. Eckelman
ATTY.

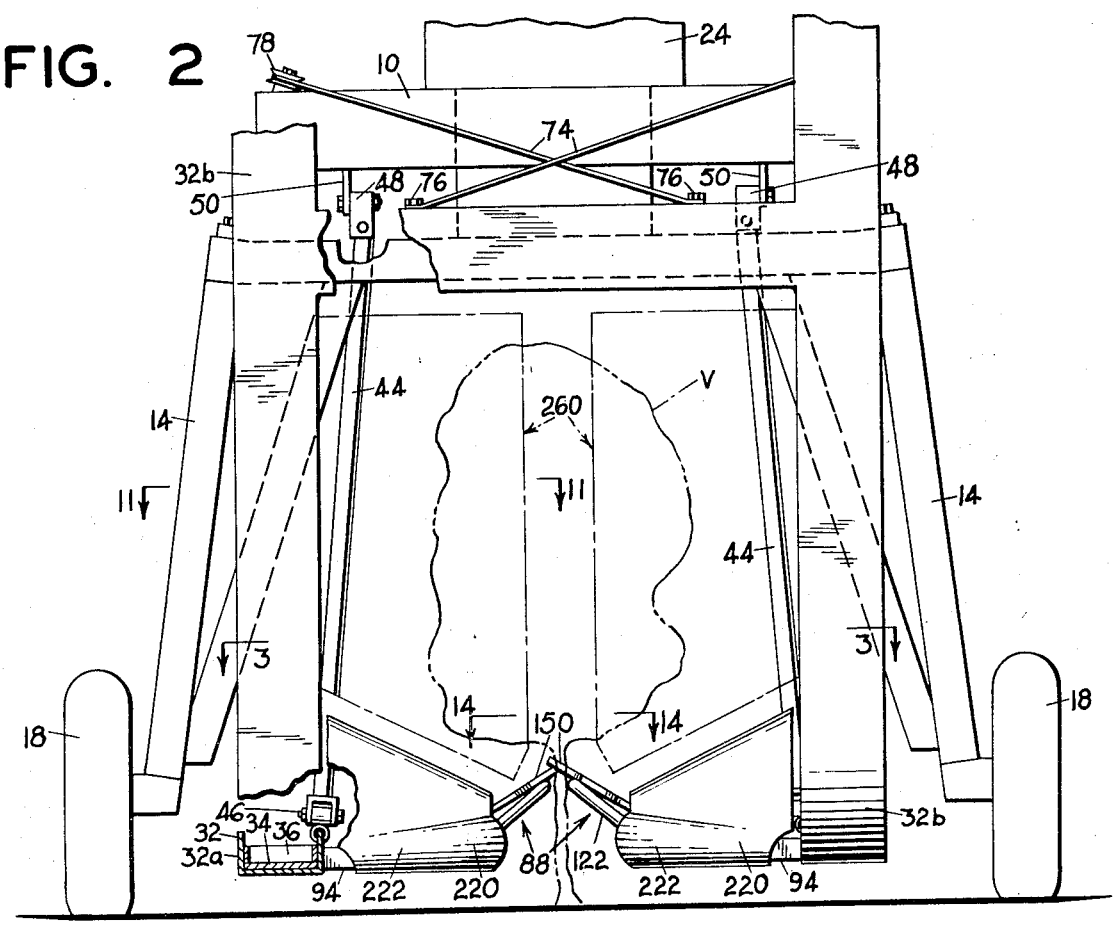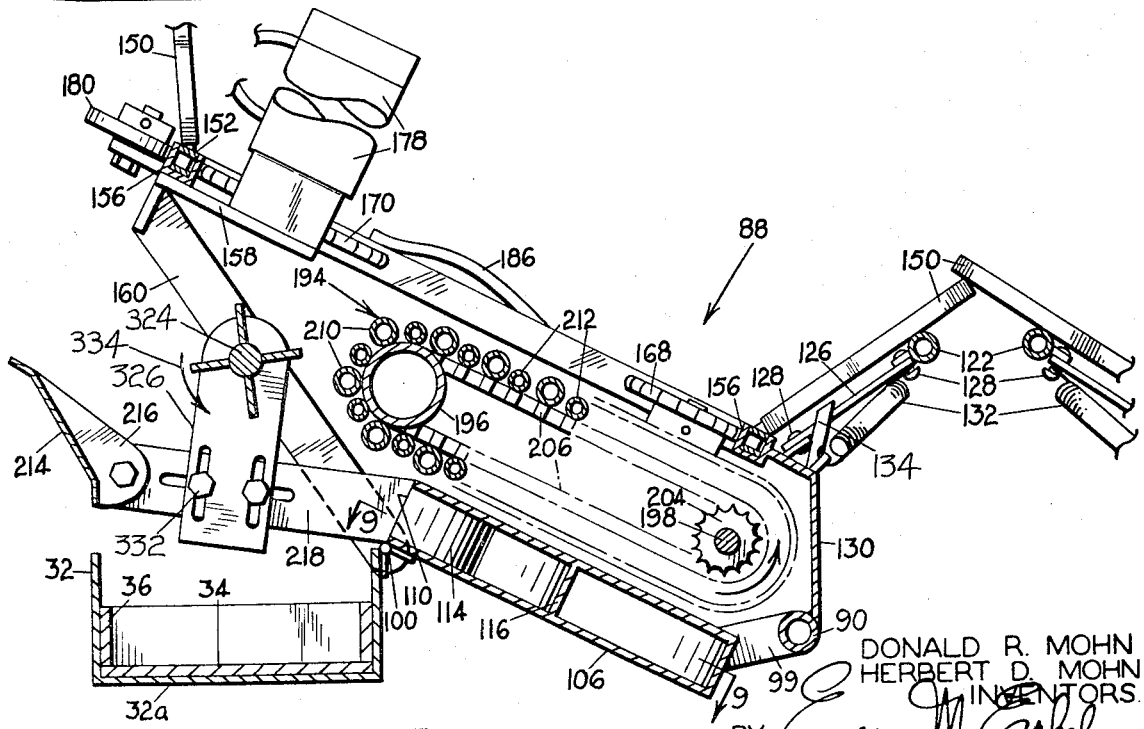

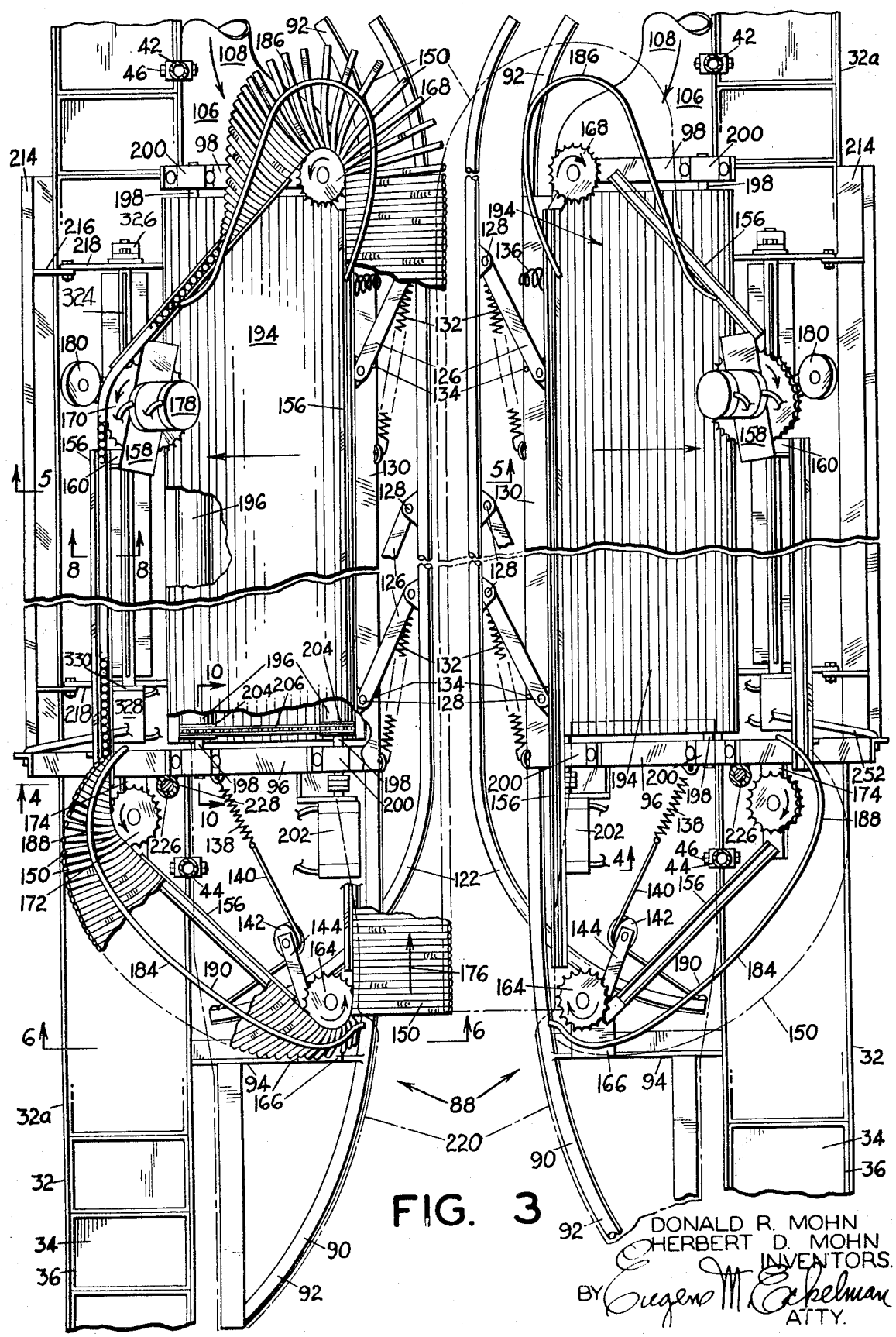

PATENTED AUG 22 1972

DONALD R. MOHN
HERBERT D. MOHN
INVENTORS.

BY Eugene M. Eckelman
ATTY.

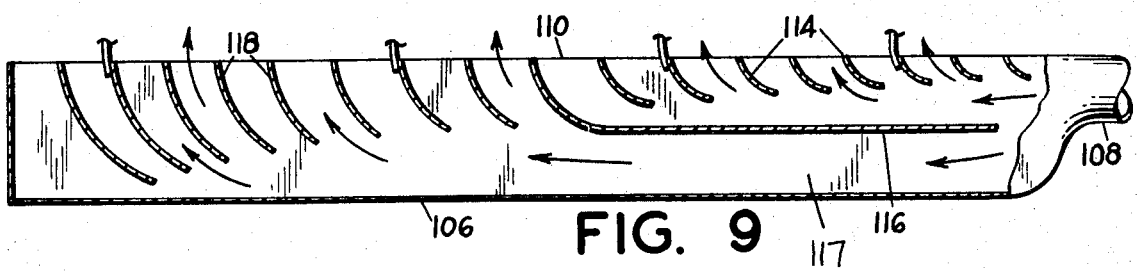
FIG. 9
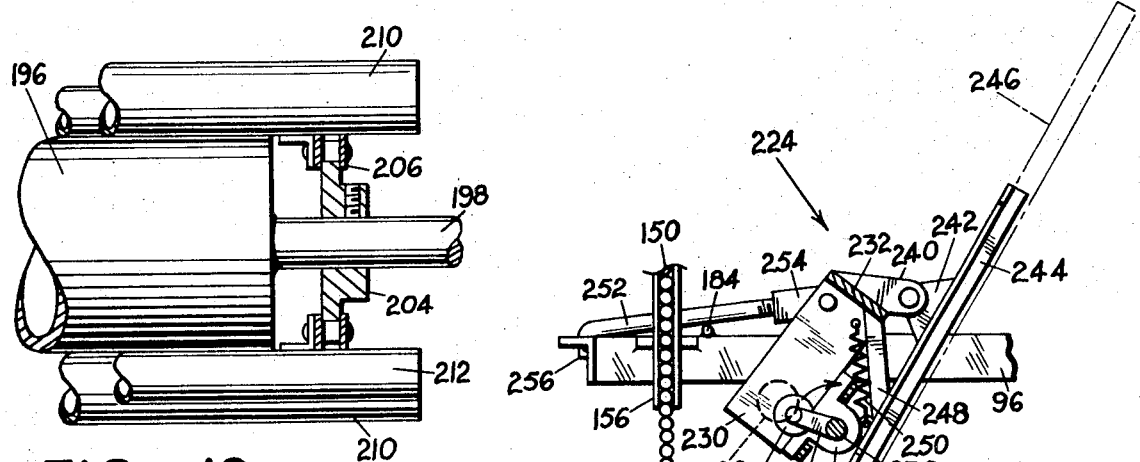
FIG. 10
FIG. 7
FIG. 14
FIG. 8
DONALD R. MOHN
HERBERT D. MOHN
INVENTORS.
BY Eugene M. Eckelman
ATTY.
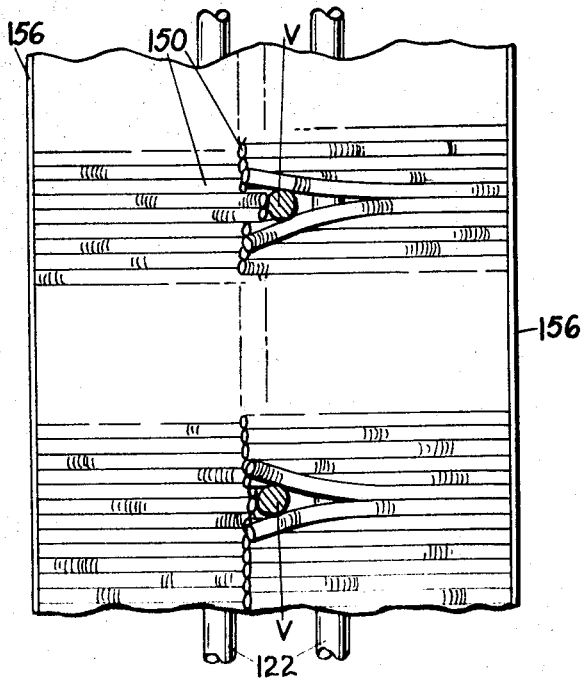
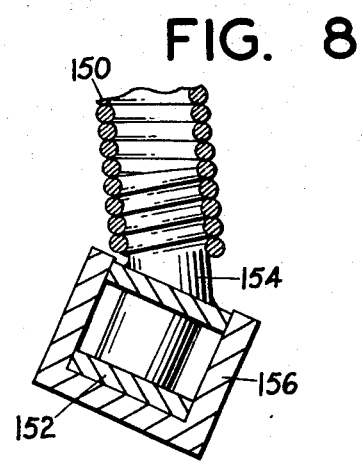

HARVESTING MACHINE

This invention relates to new and useful improvements in harvesting machines of the type adapted to remove and catch crop articles from vines or the like.

Various types of harvesting machines have been provided for removing and catching crop articles from vines and the like, and it is an objective of the present invention to provide novel and valuable improvements over such existing machines. In this regard, it is an object of the present invention to provide a machine of the type described having a novel arrangement of pickup fingers which surround the stems of the vines and which are arranged to catch falling crop articles efficiently without damaging the vines, and more particularly to provide such an arrangement of pickup fingers which are disposed in side by side adjacent relation in a continuous row and which are mounted in travelling relation on the machine in a reverse direction relative to the movement of the machine, thus being in substantially stationary position with relation to the vines as the machine moves through the vines.

Another object is to provide a novel arrangement of shaker mechanism wherein a plurality of paddles are utilized having reciprocating motion for shaking the vines; to provide shaker mechanism of the type described which is arranged to engage both lower and upper portions of the vines; to provide shaker mechanism which is adjustable angularly with relation to the vines and in addition which is adjustable so as to vary the length of throw thereof and the force with which it hits the vines.

Another object is to provide a machine of the type described having novel shaker and catch support means which is adjustable laterally and vertically on wheeled support therefore.

Still another object is to provide a machine of the type described having novel conveyor means together with novel structure for removing foreign particles.

The invention will be better understood and additional objects and advantages will become apparent from the following description taken in connection with the accompanying drawings which illustrate a preferred form of the device.

In the drawings:

FIG. 2 is a front elevational view of the machine taken on the line 2—2 of FIG. 1, a portion of this view being broken away;

FIG. 3 is a horizontal foreshortened sectional view taken on the line 3—3 of FIG. 2, a portion of this view also being broken away;

FIG. 5 is an enlarged fragmentary sectional view taken on the line 5—5 of FIG. 3;

FIG. 7 is a fragmentary sectional view taken on the line 7—7 of FIG. 4;

FIG. 8 is an enlarged fragmentary sectional view taken on the line 8—8 of FIG. 3;

FIG. 9 is a sectional view taken on the line 9—9 of FIG. 5;

FIG. 10 is an enlarged fragmentary sectional view taken on the line 10—10 of FIG. 3;

FIG. 14 is an enlarged, fragmentary plan view taken on the line 14—14 of FIG. 2.

MAIN DRIVE AND SUPPORT MEANS

Figure 1:
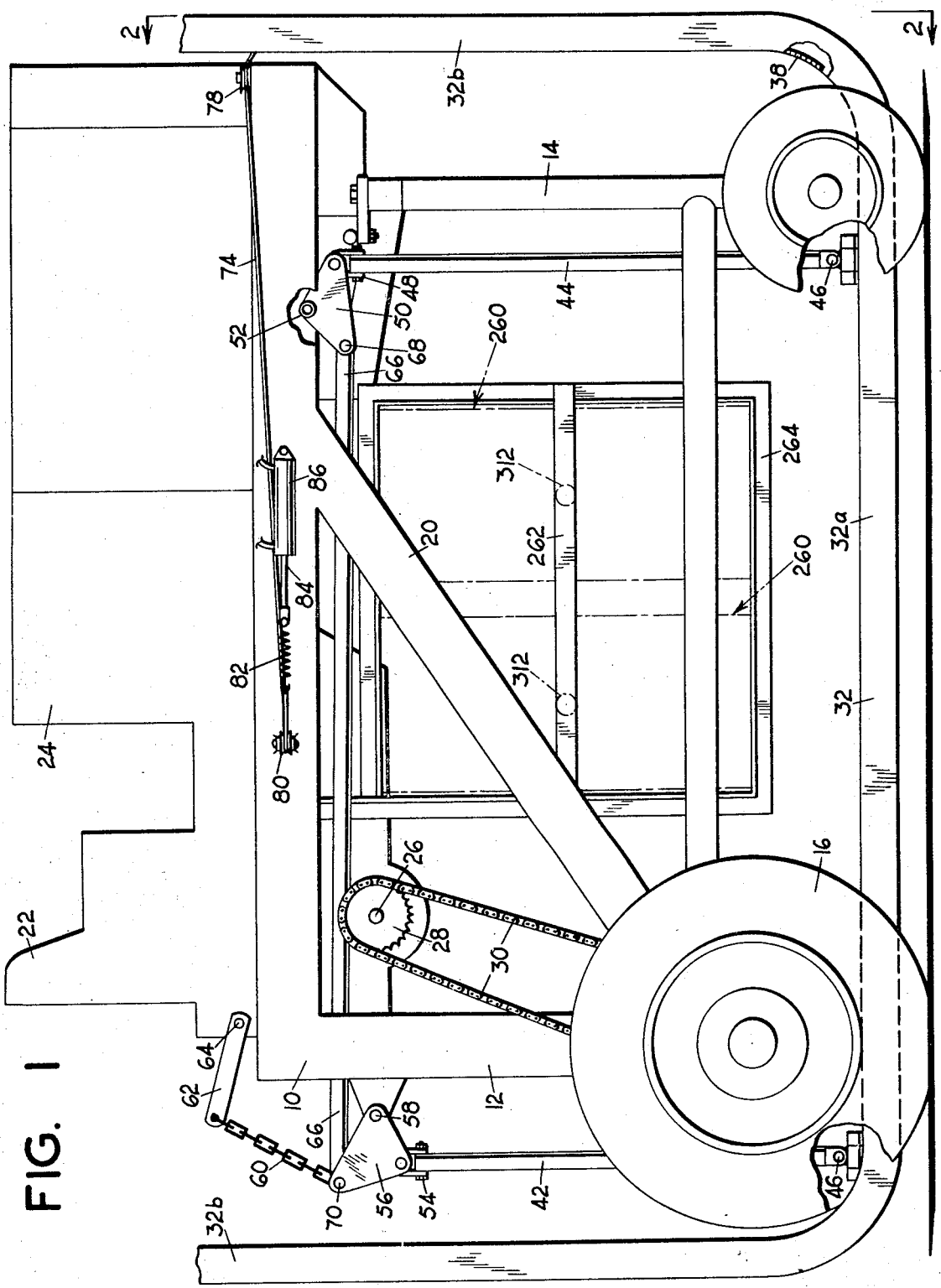
FIG. 1 is a side elevational view of the present harvesting machine, a portion of the operating means thereof being omitted for clarity.

Referring now in particular to the drawings and first to FIGS. 1 and 2, the harvesting machine of the present invention has a main frame 10 elevated from the ground by rear legs 12 and front steering legs 14. The device has rear wheels 16 and front wheels 18. Rear wheels 16 have mounted attachment on the bottom ends of legs 12 and front wheels 18 have attachment to their legs 14 for steering movement by conventional mechanism not shown. Reinforcing frame members 20 are provided as required. The frame 10 supports an operator's seat 22 and power mechanism 24 such as a gasoline engine for driving the machine as well as for driving pumps and the like for operating drive cylinders on the machine. Power drive mechanism 24 has an output shaft 26, FIG. 1, having a sprocket wheel 28 keyed thereto for driving a sprocket chain 30 in turn engaging a sprocket wheel, not shown, integrated with rear wheel structure for driving the machine.

The main frame 10 supports a crop removing and catching frame comprising conveyors 32 disposed on each side of the machine inwardly of the wheels and having a horizontal bottom segment 32a and upstanding front and rear segments 32b. As best seen in FIG. 2, the conveyor track 32 is channel-shaped and has a travelling belt 34 with cross lugs 36 forming pockets along the belt. The belt travels throughout the length of the track 32 with the upright segments 32b having enclosing wall segments 38 for confining the crop in the conveyors as it moves up the upright end segments 32b. The drive mechanism for the conveyor is not illustrated since such may comprise any conventional method of drive. The upper portion of the conveyor also is not shown. Such portion of the conveyor may deposit in a suitable container on the machine or at a treating station or the like.

Conveyor 32 is suspended from the frame element 10 by means of two rear posts 42 and two front posts 44. The lower ends of the posts 42 and 44 have pivot connections 46 to the conveyor 32, such pivot connections having double pivot action allowing longitudinal as well as lateral adjustable movement of the conveyor relative to the main frame. The upper ends of front posts 44 have pivot connections 48 with bell crank levers 50 pivotally attached by pivot means 52 to the main frame 10, the connections 48 being of a structure allowing double pivot movement of the posts, namely, movements both in longitudinal and lateral directions. The pivot connections 48 are disposed at the front of the levers 50. Rear posts 42 have pivot connections 54 at their upper ends to bell crank levers 56 having pivotal attachment 58 to the frame 10. Pivot connections 54 are of a structure also allowing both longitudinal and lateral pivotal movement of the conveyors 32.

Rear levers 56 have a chain or other suitable link connection 60 with lever arms 62 keyed or otherwise secured on an output shaft 64 from the power unit of the machine. Rods 66 connect front and rear levers 50 and 56 on each side. The front ends of these rods have pivot connections 68 with the levers 50 and the rearward ends of such rods have pivot connections 70 with the levers 56, the parts being arranged such that upon clockwise rotation of the rear levers 56 on the pivot support 58 by means of clockwise rotation of the lever arms 62, the conveyor 32 is raised upwardly. By counterclockwise movement of such rear levers 62 the conveyors are lowered. The conveyor 32 can thus be positioned a selected distance off the ground as determined by the roughness of the terrain, the condition of the vines, and other factors.

As will be more apparent hereinafter, substantially all the removing and catching means is supported on the conveyor track 32, and thus such removing and catching means also is vertically adjustable with the conveyor relative to the supporting wheeled frame. In addition to vertical adjustment, the removing and catching mechanism is laterally adjustable so that small adjustments can be made from side to side for centrally aligning the removing and catching mechanism with posts, or for other reasons. The lateral adjustable means for the conveyor 32 and structure supported thereon comprises a pair of cables 74, FIGS. 1 and 2, one of which is adapted to adjust the conveyor in one lateral direction and the other of which is adapted to adjust such conveyor in the other lateral direction. The cables have respective connections 76 at their forward ends to opposite conveyors and pass over respective side pulleys 78. Cables 74 then lead to respective rearwardly disposed pulleys 80 mounted on the frame 10. From these pulleys the cables extend forwardly and are connected to one end of respective tension springs 82 connected at their other ends to the free ends of piston rods 84 from fluid operated cylinders 86 secured to the frame 10. It is apparent that upon operation of one of the cylinders 86, the conveyor frame is pulled in one lateral direction and upon operation of the other cylinder 86 the conveyor is pulled in the other lateral direction. Such adjustment is accomplished by the lateral swinging movement of the conveyor frame on the upper pivot connections of their posts 42 and 44. Springs 82 allow for a certain amount of automatic lateral adjustment of the conveyor frame without operation of the cylinders 86, such adjustment being provided to allow for alignment with a post or the like in the event that the operator accidentally does not accurately align the machine with a crop row. The operation of the cylinders 86 is accomplished by the operator by control means not shown.

CROP CATCHING MECHANISM

Figure 4:
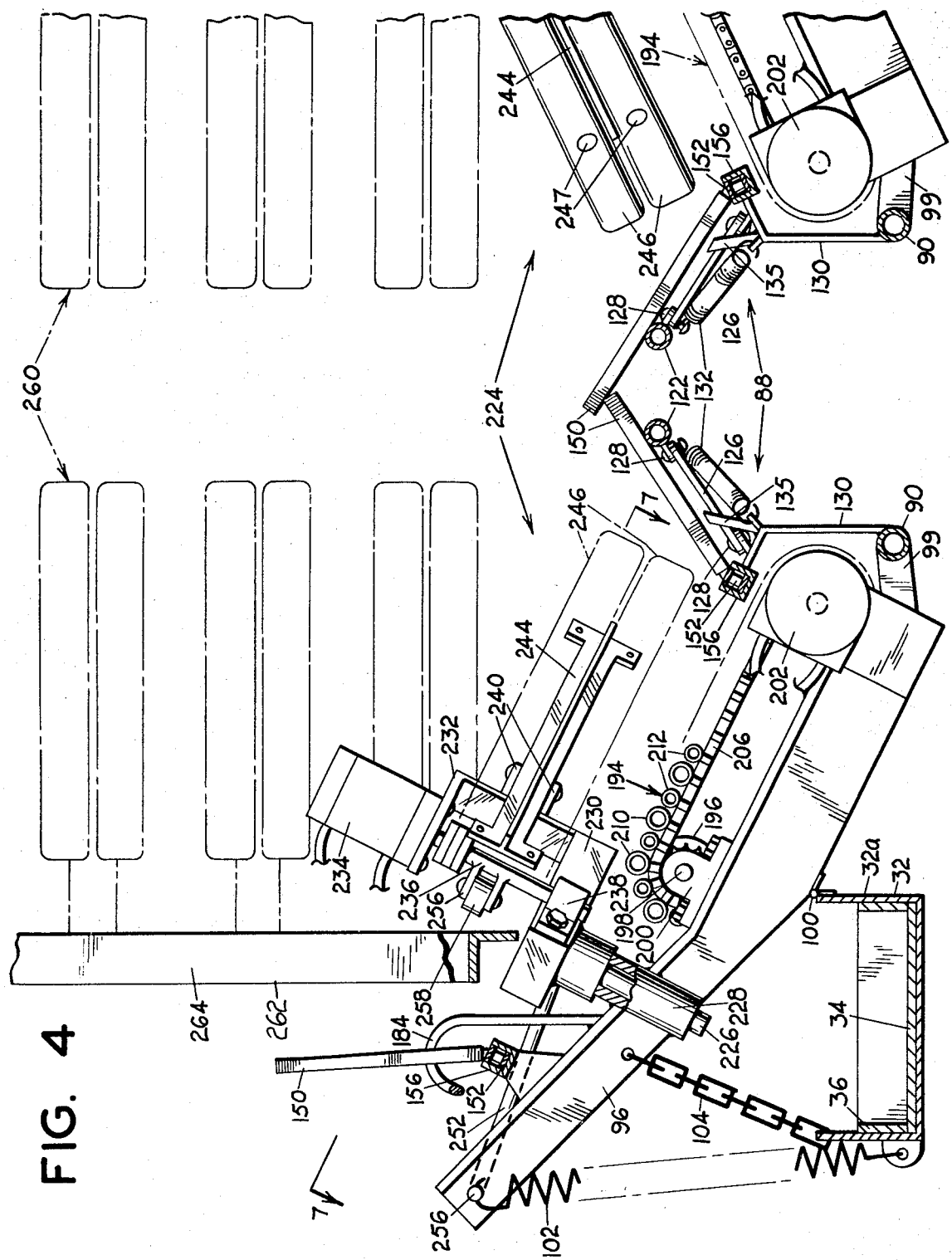
FIG. 4 is an enlarged fragmentary sectional view taken on the line 4—4 of FIG. 3.

The machine includes a lower crop catching or collector mechanism 88, FIGS. 2—5, to receive crop articles shaken from vines V. Since two sides of the machine have identical catching mechanisms, one one side will be described herein. A rub bar 90, FIGS. 3–5, having an outward curvature 92 at the front of the machine as well as at the rear, extends the full length of the crop pickup mechanism and is supported on a front arm 94, FIG. 3, an intermediate arm 96, also seen in FIG. 4, and a rear arm 98. The arms 94, 96 and 98 are integrally connected to the rub bar 90 by extensions 99, FIG. 4, and such integrated structure has a hinge connection 100 to the conveyor 32, FIGS. 4 and 5, such hinge means being provided for each of the arms 94, 96 and 98. The arms 94, 96 and 98 are angled upwardly toward the outside, as best seen in FIG. 4, and tend to tilt clockwise on the hinge connection 100 under the weight of mechanism supported thereby. A tension spring 102, FIG. 4, is connected between the outer end of arm 96 and conveyor 32 for counterbalancing the arm 96 and structure supported thereby, such spring having a force sufficient such that although the pickup mechanism normally assumes a tilted disposition it can be tilted upwardly by a slight force, thus providing a safety feature for ground irregularities wherein the mechanism can ride up over such irregularities if necessary. The pickup mechanism is held in its desired angular position by a chain or the like 104 connected between an outer portion of the arm 96 and conveyor 32.

With reference to FIGS. 3, 5 and 9, an air duct 106 is connected to and extends longitudinally between the arms 96 and 98 and has a rearwardly opening inlet portion 108. The duct 106 is enclosed except at its outer side 110, FIG. 9, which comprises a discharge opening. To provide a uniform discharge of the forced air through the full length of the duct 106, a plurality of baffles 114, FIG. 9, are provided in the duct. These baffles are disposed in upstanding relation and have the following arrangement. First, the inlet 108 to the duct 106 is to one side, namely, on the side of the discharge opening 110, and a plurality of baffles 114 are located on this side from the inlet end to about halfway back in the duct. The baffles 114 have progressive greater length toward the far side of the duct with relation to the opening 110 in order to have greater pickup of moving air toward the said far end to make up for the loss of volume due to expansion through the duct. A longitudinally extending baffle 116 runs approximately down the middle of the duct 106 and about halfway to divide the flow of air into two channels, one through the baffles 114 and one through a passageway 117 around the back side of the baffle 116. The far end of the duct 106 has a plurality of baffles 118 similar to the baffles 114 in that they progress in length toward the far side of the duct, and evenly distribute the discharge air throughout the length of the one end of the duct.

The forced air through the duct 106 and out its open side 110 serves to blow dirt, leaves and other foreign particles from crop articles which are deposited in the conveyor 32 from above, as will be more apparent hereinafter.

The pickup mechanism 88 also includes an auxiliary rub bar 122 on each side, FIGS. 3, 4, 5 and 14. One purpose of the bars 122 is to engage crop bushes and hold them compacted together from the sides. FIG. 2 illustrates the normal position of the auxiliary rub bars 122 and the supporting engagement thereof of vines V. These bars 122, best shown in FIGS. 2–5, are angled upwardly toward the center and each is supported on links 129 having pivot connections 128 at one end to such auxiliary rub bars 122 and at the other end to a longitudinal frame member 130 secured integrally to rub bar 90. Links 126 angle rearwardly and are capable of pivotally moving the auxiliary rub bar 122 to an outermost or normal position, as shown in FIG. 3, or to a retracted position to widen the gap between the opposite auxiliary rub bars. Each rub bar is normally held in its outer or normal position by tension springs 132 connected at one of their ends to the rub bar and at their other ends to forward points on the frame and arranged normally to urge the rub bar to its outer or normal position. Stop pins 134 are secured to the frame member 130 in a selected position such that they are in the path of movement of links 126 at a desired limit position of such links in their outer position. To prevent overcenter retracted movement of the rub bar 122 a backup compression spring 136 FIG. 3, is secured to the frame member 130 and is arranged for engagement by one of the links 126. Another spring 138 at the front of the mechanism counterbalances the springs 132 in holding the auxiliary rub bar in a somewhat balanced outer or normal position, and such comprises a tension spring connected at one of its ends to a line 140 passing over a pulley 142 secured on an arm 144 in turn secured to front arm 94. The other end of spring 138 is connected to arm 96, and line 140 is connected to the front end of the bar 122 whereby as stated the spring 138 partially counteracts the force of springs 132 to provide a floating bar structure. Thus, bars 122 on each side of the machine are capable of compressing the bushes together for harvesting crop articles therefrom and at the same time are readily capable of opening up for larger bushes or for irregularities in the bushes.

The actual crop catching portion of the machine comprises a plurality of flexible fingers 150, FIGS. 2-5 and 14, disposed in side by side close relation to catch crop articles. These fingers are angled upwardly as best seen in FIGS. 2, 4 and 5 for conveying fallen crop articles to the sides. The two sets of fingers which extend from opposite sides of the machine have an overlapping engagement at their tip ends, as best shown in FIGS. 4 and 5, in order to fully cover the area underneath the vine V. The fingers, being flexible, are adapted to receive the stem of the vines V as the machine progresses, to be more fully described hereinafter. The pickup fingers 150 may comprise any type of flexible member capable of moving into engagement with a vine without damaging the latter. As one illustration and as shown in the drawings, the fingers 150 comprise helical tension springs. It is preferred that they be quite flexible to accomplish the intended purpose although they should have sufficient rigidity to project outwardly in self-sustaining relation for catching crop articles. These fingers lie on the auxiliary rub bars 122 and thus are supported from underneath.

One of the important features of the invention is that the pickup finger assembly is movable longitudinally of the machine, and for this purpose each of the spring fingers 150 is secured at its base to the side of a sprocket type chain 152, FIGS. 4-5 and 8. The connection between the spring fingers 150 and the chain 152 is detailed in FIG. 8 wherein it will be seen that chain 152 has a plurality of studs 154 secured to its side in side by side relation and the fingers are fitted thereon in secured relation such as by a press fit or by welding.

The support for the movable finger pickup mechanism comprises channel-shaped guide tracks 156, FIGS. 3-5 and 8. One of the guide tracks is secured longitudinally of the machine inwardly toward the center on the upright frame member 130, FIGS. 3, 4 and 5. The other guide channel 156 is disposed outwardly to form a return line for the chain 152 and is supported at one of its ends on the arm 96, FIG. 4, and at its other end on a frame member 158 in turn secured to the air duct 106 by an arm 160, FIG. 5. Since the guide tracks 156 are supported on the angled pickup mechanism, the outer track is disposed in a higher plane than the inner track. The chain 152 operates over sprocket wheels in alignment with the two guide tracks 156, best seen in FIG. 3. Such wheels comprise a front sprocket wheel 164, FIG. 3, mounted on an arm 166 in turn secured to arm 94, a rear sprocket wheel 168 also seen in FIG. 5, mounted on the rear arm 98 in longitudinal alignment with the sprocket wheel 164, a sprocket wheel 170 mounted on the frame member 158 laterally outwardly from sprocket wheels 164 and 168, and a sprocket wheel 172 in longitudinal alignment with sprocket wheel 170 and mounted on an arm 174 secured to front arm 96. The sprocket wheels 164, 168, 170 and 172 are arranged to support the chain 152 in a continuous run around the pickup mechanism of the machine. As best seen in FIGS. 4 and 5, the guide track 156 for the chain is positioned and the angular support of the fingers 150 on the chain is such that the fingers assume the desired upward angle for cooperation with the fingers from the other side to make the peaked arrangement for catching falling crop articles and conveying it by gravity to side conveyors, to be described.

The chain is driven in a direction such that its center run portion moves rearwardly of the machine, namely, in the direction of arrow 176, FIG. 3. For driving the chain in this direction, the sprocket wheel 170 is secured to a fluid operated motor 178 mounted on the frame 158. An idler wheel 180, also mounted on the frame 158, is disposed on the outside of the chain to maintain the latter in engagement with the sprocket wheel 170. The speed of motor 178 is regulatable in a well known manner so that the speed of the chain can be varied. That is, as a feature of the invention it is desired that the fingers 150 travel rearwardly of the machine at the same rate of speed as the forward travel of the machine so that as the machine moves into the vines there is a minimum of frictional engagement of the fingers with such vines. The fingers 150 engage the vines 124 in a manner shown in FIG. 14, and since the fingers move backward as fast as the machine moves forward, the vines are engaged by the same fingers 150 throughout substantially the entire travel of the machine past the vine. Thus, there will be little or no abrasion of the vines by the pickup mechanism.

Figure 6:
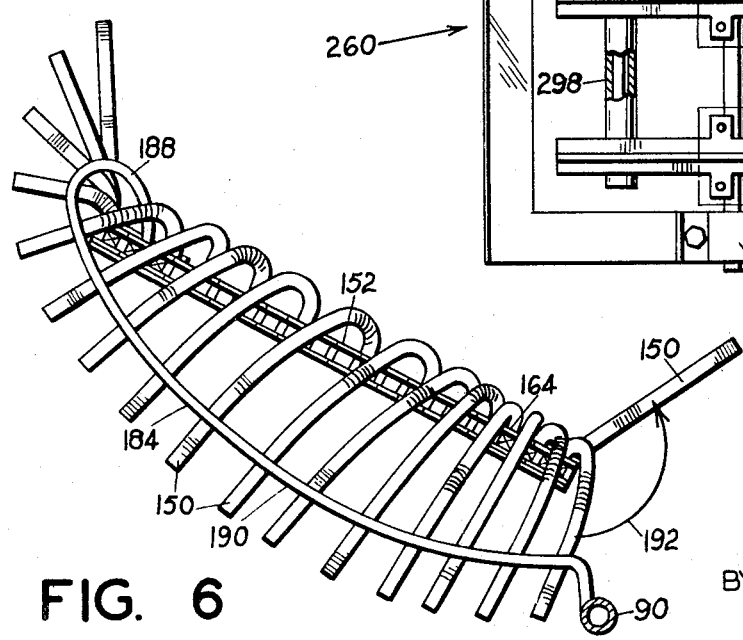
FIG. 6 is an enlarged fragmentary sectional view taken on the line 6—6 of FIG. 3.

The fingers 150 are brought into and removed from efficient vine engaging positions by front and rear guide bars 184 and 186, respectively. The front guide bar, FIGS. 3 and 6, has one end secured to the rub bar 90 and its other end secured at a rearward point to the front arm 96. As best seen in FIG. 6, the front guide 184 has a rearwardly disposed curvature 188 which is vertical for receiving the substantially vertical fingers as they come forward on the outside run. The guide bar 184 then has a curvature 190 leading from the curvature 188 in a forward and inward as well as somewhat horizontal disposition so as to keep the fingers in an out-of-the-way position as long as possible before releasing them to spring into position from off the end of guide bar 184. The arrow 192 in FIG. 6 shows the movement of the fingers as they release from the guide bar.

The rear guide bar 186, FIG. 3, is U-shaped and extends rearwardly with one end connected to the frame member 130 and the other end connected to a rear portion of the guide track 156. This bar assumes approximately the same inclined relation as the fingers 150 in their center run so that as the fingers pass around the sprocket wheel 168 they cannot tilt up to their normal, almost vertical position in the back run of the chain 152. Instead they are held down by the bar 186 until they are out of the area of the vines and thus avoid abrading the latter.

The pickup mechanism also includes a conveyor 194, FIGS. 3–5 and 10, adapted to receive the crop articles from the fingers 150 and convey such articles to the conveyor 32. Conveyor 194 includes a pair of longitudinally disposed, parallel drums 196 supported on shafts 198 journaled in end bearings 200 mounted on the arms 96 and 98. One of the shafts 198 is driven by a fluid operated motor 202. The shafts 198 have end sprocket wheels 204 over which sprocket chains 206 operate.

Secured to the chains in longitudinal relation of the machine are alternate large and small tubular members 210 and 212, respectively, such as pipes. The alternate large and small size of tubular members 210 and 212 form longitudinally extending pockets for conveying the crop articles. In a preferred arrangement, the pipes 210 and 212 are spaced a short distance apart and more particularly a selected spacing is provided such that the crop articles are supported thereon but small foreign articles are allowed to drop through. The individual mounting of the pipes 210 and 212 on the end chains 206 provides a flexible conveyor operable over the end drums.

With reference to FIGS. 3 and 5, a longitudinal baffle 214 is disposed above the conveyor 32 and is arranged to direct crop articles which are discharged off the conveyor 194 into the conveyor 32. Baffle 214 has integral ear members 216 which are secured to laterally extending arms 218 in turn secured to the duct 106 for supporting the baffle 214.

The machine has a front shield 220 on each side, FIGS. 2 and 3. The shields are shown in full lines in FIG. 2 and in phantom lines in FIG. 3. These shields extend over the rub bars 90 in a curved bottom portion 222 and upwardly and rearwardly to about the location of the front arm 96. The primary purpose of the shields is to engage the vines ahead of any other structure of the machine to prevent the vines from becoming entangled, in addition of course to directing any vines or portions thereof into the central straddling area between the auxiliary rub bars 122.

SHAKER MECHANISM

The machine employs shaker mechanism for removing the crop from the vines and similar to the pickup mechanism it has identical structure on each side and only one side will be described. A first or auxiliary shaker apparatus 224, which is supported on the suspended pickup mechanism adjacent the front, has a shaft 226, FIGS. 4 and 7, rotatably mounted in a tubular support 228 secured integrally to the arm 96. Although FIG. 3 does not show details of the auxiliary shaker mechanism 224, it shows the tubular support 228 and shaft 226 in section to indicate the positioning of such shaker mechanism with relation to other parts. Being mounted on the arm 96, the auxiliary shaker mechanism 224 is disposed forwardly of the machine and is intended to provide an initial shaking function low on the bushes. Shaft 226 supports integrally a body member 230 to which is secured an upright integral frame member 232 in turn supporting a fluid operated motor 234. Motor 234 drives a downwardly directed shaft 236 having journaled engagement at its lower end in a bearing 238 secured to the body member 230.

Upright frame member 232 has pairs of inwardly directed ears 240 having pivot connections with lugs 242 on shaker arm supports 244. Such supports 244 comprise T-shaped arms to which pairs of arms or paddles 246 are secured such as by bolts 247, FIG. 4. The arms 246 on the left side of FIG. 4 are shown in phantom and the arms on the right side are shown in full lines. It is preferred that the connection of the arms 246 on the supports 244 comprise a removable connection so that selected arms may be substituted one for the other depending upon the type and size of vines being shaken. Projecting from the upright frame member 232 to a point behind the shaker arm support 244 is a stop finger 248, FIG. 7, and the shaker arm support 244 is normally held against such stop finger by a tension spring 250 connected between the body member 230 and the back side of shaker arm support 244. As also seen in FIG. 7, the body member 230 extends angularly of the machine so that the arms 246 have angular engagement with the vines. The body member 230 is secured against rotation with its shaft 226 by means of a bolt 252 having threaded connection 254 with an end of the member 230 which is opposite from the location of the shaft 226 and having a bent end portion 256 engageable in a suitable aperture in arm 96 in a laterally outward position. By means of the threaded connection 254 the angular disposition of the body member 230 and consequently the arms 246 can be changed as desired by threadedly adjusting the said threaded connection.

The shaker arm support 244 is pivoted by a lever 256 having a roller 258 mounted rotatably thereon. Lever 256 is secured to shaft 236 and rotates therewith. As the shaft 236 rotates under power of the motor 234, the roller 258 engages the back side of shaker arm support 244 each time it rotates to pivot the support 244 against the action of spring 250. Spring 250 returns the support 244 to complete the reciprocating shaking movement. The interval of engagement of the roller 258 with the shaker arm support is controlled by the speed of operation of the motor 234.

Figure 13:
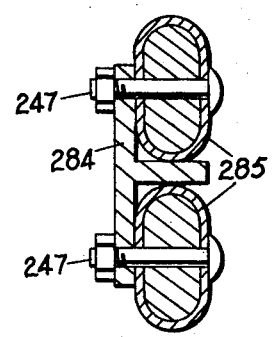
FIG. 13 is an enlarged sectional view taken on the line 13—13 of FIG. 11.

The shaker mechanism thus far described comprises an auxiliary mechanism for acting upon lower vine portions, and a main shaker mechanism 260 is disposed rearwardly therefrom and in a higher plane. Such is illustrated in FIG. 4 wherein the main shaker mechanism 260 is shown schematically. Shaker mechanisms 260 are disposed on each side of the machine and are secured to the main frame of the machine rather than to the pickup mechanism as are the shakers 224. For the purpose of supporting the shaker mechanisms 260 and with reference to FIGS. 1, 4, 11 and 12, a box-like frame 262 is secured in upright relation to the frame elements 10 and 20 of the machine. Supported on the frame 262 is an inwardly disposed box-like frame 264, the latter frame having support on the outer frame 262 by means of inwardly directed frame members 266, best seen in FIG. 11. The shaker mechanism on each side includes a vertical shaft 268, FIGS. 11 and 12, having journaled engagement in a lower bearing member 270 of the inner frame 264 and driven by a fluid operated motor 272 mounted on an upper portion of the frame 264. A body member 274 has a bearing 276 secured to it, and such bearing rotatably receives the shaft 268. A collar 277 is secured to the shaft under the member 274 to support the latter vertically but rotatably on the shaft. The body member 274 extends angularly inwardly and to the rear and integrally supports on its inwardly directed edge an upright channel shaped member 278 to which are secured a number of support fingers 280 each having a pivot connection 282 at one end, namely, at its rearward end, to a shaker arm support 284. Shaker arm supports 284 are T-shaped in construction, as seen in FIG. 13, and are arranged to have arms or blades 285 removably bolted thereto, as by bolts 247. Each support arm 284 is urged in a clockwise direction, FIG. 11, by a compression spring 286 mounted on a bolt 288 pivotally connected at 289 at one end to the arm support 284 and passing through the finger 280, the springs having opposed end abutment between the fingers 280 and nut means 290 on the bolts. The nut means 290 are adjustable on the bolts 288 to vary the compressive force of the springs. Such permits adjustment of the force at which the shaker arms hit the bushes, as will be described in greater detail hereinafter.

Body member 274 integrally supports a forwardly projecting ear 292 providing rotatable support for an upright shaft 294. Shaft 294 has a radially extending arm 296 to the free end of which is secured an upright rubber covered tube 298. Tube 298 comprises a stop or limit member for the shaker arm supports 284 whereby normally the springs 286 urge the said supports in engagement with the stops 298. The stops 298 have an adjusting feature for varying the throw of the shaker arm supports 284, comprising a lever arm 300 projecting laterally from the shaft in integral relation and pivotally connected at its free end to an adjusting rod 302. Rod 302 passes freely through a collar 303 having a pivot connection 304 with the body member 274 at the end of the latter opposite from its end which has rotatable support on the shaft 268. A pair of adjusting nuts 305 are engageable with a threaded end 306 of the adjusting rod 302 on opposite sides of the collar 303. By suitable adjustment of the nuts 305 the rotative positioning of the arms 300 and 296 and the shaft 294 is accomplished to vary the lateral positioning of the stop tube 298 and thus the amount of throw of the shaker arm supports.

Figure 11:
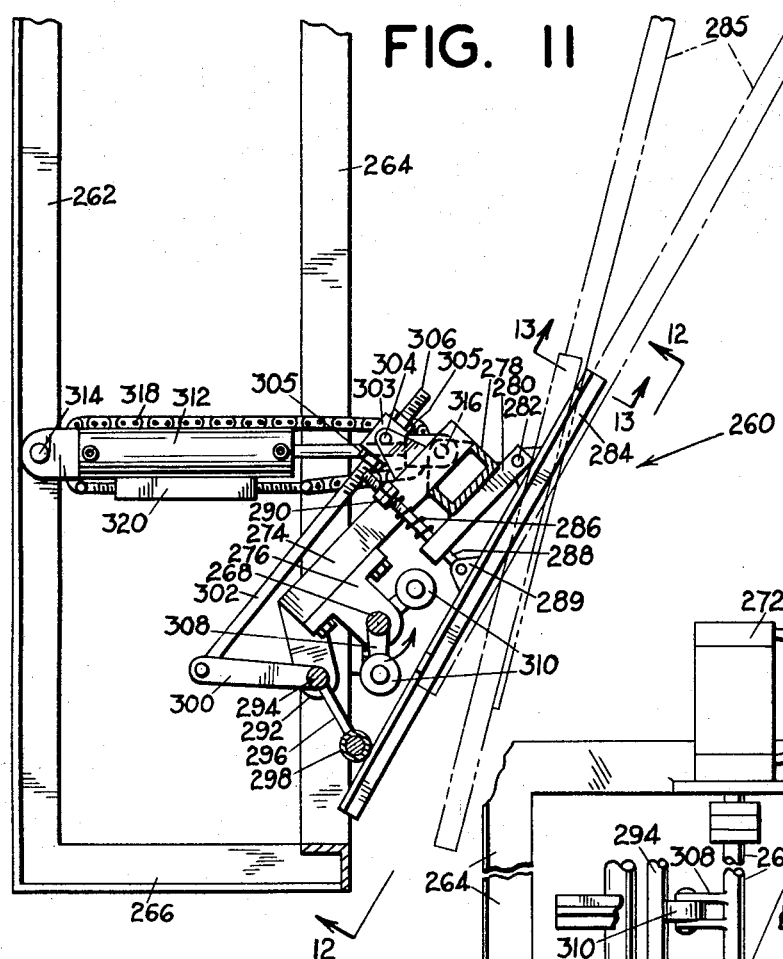
FIG. 11 is a fragmentary horizontal sectional view taken on the line 11—11 of FIG. 2.

Shaft 268 has a plurality of levers 308, one for each shaker arm support 284, and these levers have rollers 310 supported on their outer ends which upon rotation of shaft 268 engage the back side of shaker arm supports and pivot them in a counterclockwise direction, FIG. 11, against the action of springs 286. When the rollers 310 move out of engagement with the shaker arm supports 284, the springs return the latter in a clockwise direction into engagement with stop tube 298. It is apparent then that upon powered rotation of the shaft 268 by the motor 272, the shaker arm supports and their arms 285 are reciprocated in a shaking operation.

As best seen in FIG. 11, the various rollers 310 on the shaft 268 are located at different positions around the shaft so that they engage their respective shaker arm supports at different intervals. Such provides a sequential shaking operation of the vines by the plurality of paddles and in addition has the advantage that no mechanical strain is placed on the parts by multiple units operating in unison.

It is desired that the shaker units 260 be pivotally adjusted on the shaft 268 for selective positioning in the machine, and for this purpose a fluid operated cylinder 312 has a pivot connection 314 at its base end to the outside shaker frame 262 and a pivot connection 316 at its piston rod end to the free end of the body member 274. It is apparent that upon operation of the fluid operated cylinder 312 to extend or retract its piston rod the angular adjustment of the member 274 and the shaker arm supports 284 can be varied on its pivot point 268. Such positioning of the member 274 depend upon the thickness of the bushes, the type of crop article, and other factors. It is also preferred to provide limiting means for the outward movement of the piston rod of cylinder 312 so that the support arms can be retracted if desired and then extended back to its former position, and for this purpose a flexible linkage such as a chain 318 is extended longitudinally around the cylinder and around the piston rod and has adjustable length connection at its ends to opposite ends of a turnbuckle 320.

With reference to FIGS. 3 and 5, means are preferably employed to assist in the discharge of large leaves or the like from the unloading point of conveyors 194. Such means comprises a paddle wheel 324 rotatably supported at one end in an upstanding plate 326 connected to a rearwardly disposed arm 218 and at its other to a fluid operated motor 328 mounted on an upstanding plate 330 in turn mounted on a forwardly disposed arm 218. Support plates 326 and 330 have adjustable bolted slot connections 332 with their respective arms 218 for movement vertically and laterally relative to the conveyors 194. Paddle wheels 324 are rotated in a counterclockwise direction as illustrated by the arrow 334 in FIG. 5 and serve to catch large leaves from conveyor 194 and hold them in a flat position temporarily so that such leaves will be caught by the forced air from the duct 106 and be blown out beyond the conveyor 32. Without the paddle wheels, it is possible that some large leaves such as grape leaves may, if crumpled or bunched together, be heavy enough to be discharged into the conveyor 32 and plug the latter. Such paddle wheels, however, avoid such possibility.

OPERATION

Figure 12:
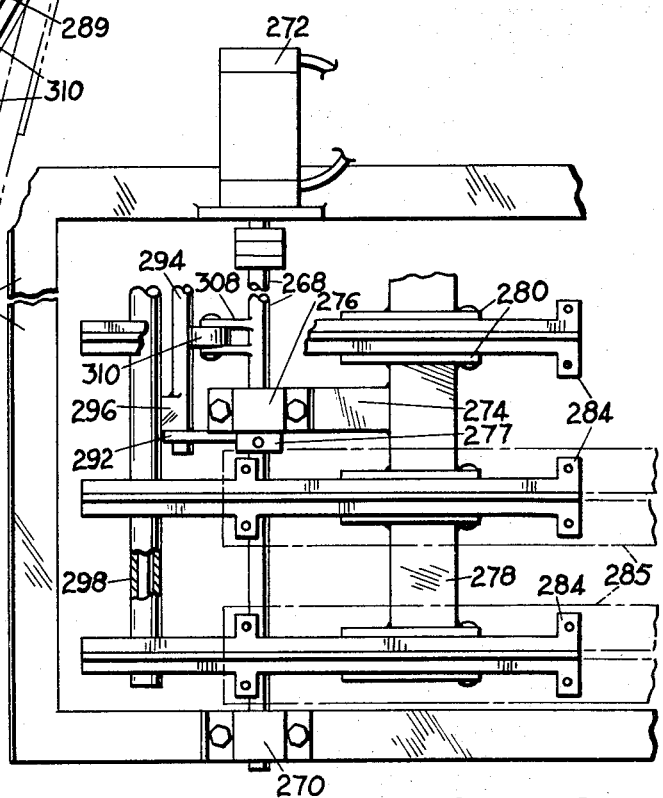
FIG. 12 is a fragmentary vertical elevational view, partly broken away and taken on the line 12—12 of FIG. 11.

Before setting the device in operation, suitable adjustments are made. As one adjustment, the speed of motors 272, FIG. 12, is regulated to provide the desired shaking speed on the arms 285, such speed depending upon the type of crop article being harvested, the condition of the vines, and other factors. The speed of motors 234, FIG. 4, is also adjusted for setting the desired reciprocating speed of the auxiliary shaker mechanism 224. The angular position of the shaker-arm supports 284 with relation to the opening through the machine is fixed by suitable adjustment of fluid operated cylinders 312 and the limiting linkage 318. Also, the angular disposition of the auxiliary shaker arm supports 244 is adjusted by suitable adjustment of the bolts 252. In addition, the speed of motors 178, FIG. 3, for driving the pickup fingers rearwardly is adjusted so as to correspond substantially with the forward speed of the harvesting machine. Thus, as was explained hereinbefore the fingers 150 do not slide in the bushes but are substantially fixed with relation to the vines to prevent any damage to the latter. The speed of the motors thus far described in the operation can be regulated from the operators compartment by suitable controls.

Further adjustments include setting the amount of throw of the shaker support arms 284, and such is accomplished by the selective positioning of the stop members 298. The angular positioning of the shaker arm supports 244 and 248 with relation to the longitudinal central opening through the machine is adjusted by the selected settings of bolts 252 for the shaker arm supports 244 and the linkages 318 for the shaker arm supports 284. The angular position is preselected for best results, with the range generally being between 10 and 30 degrees to the longitudinal center line of the machine. An effective angle of these members has been found to be about 15°. In the shaking operation the vines are squeezed together by the opposed shaker units so that effective crop removal is accomplished by the shaker arms.

Other adjustments include the selective tensioning of springs 286, FIG. 11, to fix the impact force at which the arms 285 hit the vines.

To initiate the harvesting operation, the machine is directed in straddling relation down a row of vines. The machine need not be precisely centered on the row since a certain margin of off-center travel is allowed through the fingers 150. In any off-center travel, the auxiliary rub bars 122 automatically open up to receive the vines or posts. If the operator should become too far misaligned with the center of the row, the rub bars 90 will engage the posts or bushes and cause the entire suspended picking mechanism to shift laterally. Such automatic lateral shifting is permitted by means of springs 82 incorporated in the cables 74 which hold the suspended mechanism flexibly in a lateral direction. If desired, the operator can adjust the picking mechanism relative to the wheeled frame by powered operation of the cylinders 86. Also, the operation of the lever arms 62 from the shaft 64, the entire picking mechanism can be raised or lowered as desired, depending upon the contour of the surface or the type of vines from which the crop is being harvested.

The crop which is shaken from the vines falls on the fingers 150 which due to their flexibility provide a cushioned landing for the crop. The crop then rolls off the fingers onto the conveyors 194 from whence it is deposited in the longitudinal conveyors 32. The forced air being ejected from the side openings 110 of the ducts 106 blows the foreign particles out the side as the crop articles move by gravity from conveyor 194 to conveyor 32. The velocity of forced air from ducts 106 is preselected as is the angle of baffle 214 for the most efficient removal of the foreign particles. Such conditions may be adjusted depending upon the type of crop and other factors. If the machine is operating in a large leaved crop, paddle wheels 324 catch and hold such leaves flatwise temporarily so that such leaves are removed by the forced air.

It is to be understood that the form of our invention herein shown and described is to be taken as a preferred example of the same and that various changes in the shape, size and arrangement of parts may be resorted to without departing from the spirit of our invention or the scope of the subjoined claims.

Having thus described our invention, we claim:

1. A crop harvesting machine comprising
   a. a main frame arranged to move over the ground,
   b. said frame having a longitudinal opening therethrough wherein it is arranged to straddle vines from which crop articles are to be removed,
   c. shaker means engageable with the vines for shaking crop articles therefrom,
   d. and a plurality of laterally extending catching fingers disposed below the shaker means,
   e. said fingers comprising coil springs, being flexible and being disposed in side by side close relationship to form longitudinal catching means arranged to encompass stem portions of the vines for catching crop articles shaken from the vines.

2. The crop harvesting machine of claim 1 including a plurality of said fingers extending centrally of the machine from both sides in overlapping relation whereby the fingers are arranged to have said encompassing relation with the vine portions for catching crop articles falling from all sides of the vines and around the stem, said fingers being of substantially uniform diameter throughout their length.

3. The crop harvesting machine of claim 1 including
   a. a laterally movable conveyor arranged to receive the crop articles from said fingers and discharge such articles laterally,
   b. blower means for blowing foreign particles out the side of the machine from the discharge end of said laterally movable conveyor,
   c. and a rotating paddle wheel adjacent to the discharge end of said laterally movable conveyor for catching leaves and subjecting them flatwise to the air stream of the blower means for removal with the other foreign particles.

4. The crop harvesting machine of claim 1 including
   a. support means secured to one end of said fingers and being movably mounted on said frame for travel in a direction reverse to the forward travel of the machine,
   b. and means arranged to drive said support means in said reverse direction at a speed substantially the same as the forward speed of said machine.

5. The crop harvesting machine of claim 4 wherein said support means comprises a continuous length flexible linkage operating around end revolving members.

6. The crop harvesting machine of claim 4 wherein
   a. said support means comprises a continuous length flexible linkage operating around end revolving members,
   b. and said drive means are variable speed drive means.

7. The crop harvesting machine of claim 1 including a. support means for said fingers,
b. said fingers being connected to said support means at one of their ends whereby the other end is free to extend in close relationship with the stem portions of the vines,
c. said fingers being angled upwardly from said support means for directing crop articles falling thereon in a downwardly lateral direction,
d. and a longitudinally extending laterally movable conveyor arranged to receive the crop articles from said fingers and discharge such articles laterally.

8. The crop harvesting machine of claim 7 including a longitudinally movable conveyor arranged to receive the crop articles from said laterally movable conveyor.

9. The crop harvesting machine of claim 7 including longitudinal rigid frame members extending under said fingers intermediate the connected end and the free end of supporting said fingers.

10. The crop harvesting machine of claim 7 including
a. longitudinal rigid frame members extending under said fingers intermediate the connected end and the free end for supporting said fingers,
b. and means mounting said frame members for lateral adjusting movement to accommodate widened obstructions.

11. The crop harvesting machine of claim 1 wherein
a. said shaker means comprises a plurality of reciprocatable paddles disposed angularly across said opening in the frame,
b. and including means adjusting the angularity of said paddles across said opening.

12. The crop harvesting machine of claim 1 wherein
a. said shaker means comprises a plurality of reciprocatable paddles disposed angularly across said opening in the frame,
b. and including means adjusting the angularity of said paddles across said opening,
c. and means adjusting the length of said reciprocating movement of the paddles.

13. The crop harvesting machine of claim 1 wherein
a. said shaker means comprises a plurality of reciprocating paddles disposed angularly across said opening in the frame and having pivotal support on the frame for adjustable positioning as to its location laterally in the opening,
b. and including means adjusting the angularity of said paddles across said opening
c. and adjusting means connected to said shaker means for holding the latter in selected positions of its pivotal support.

14. The crop harvesting machine of claim 1
a. including an auxiliary frame supported on said main frame for lateral adjustment,
b. said auxiliary frame supporting said shaker means and said fingers.

15. The crop harvesting machine of claim 16 including means vertically adjusting said auxiliary frame.

16. The crop harvesting machine of claim 1 including conveyor means for receiving crop articles from said catching fingers, said conveyor means comprising
a. a pair of end drums disposed in parallel relation longitudinally of said machine,
b. continuous flexible links operating laterally around said drums,
c. means for driving at least one of said flexible links rotatably around said drums,
d. and a plurality of article holding strips secured to said links in parallel relation to said drums,
e. some of said strips being smaller than the others to form pockets for holding articles.

17. The crop harvesting machine of claim 16 wherein said strips are alternately large and small and are spaced from each other to allow foreign articles to fall through.

18. A crop harvesting machine comprising
a. a main frame arranged to move over the ground,
b. said frame having a longitudinal opening therethrough wherein it is arranged to straddle vines from which crop articles are to be removed,
c. catching means on said machine for catching crop articles removed from the vines,
d. at least two sets of vertically extending reciprocating paddles mounted on said machine above said catching means and disposed in opposed relation across said opening in the frame for engaging opposite sides of a vine
e. each of the sets of paddles having at least two horizontally extending paddles, f. and drive means for alternately reciprocating the individual paddles in each set relative to the other paddles of the same set.

19. The crop harvesting machine of claim 18 wherein
a. said paddles are pivotally supported for accomplishing the reciprocating movement,
b. said drive means alternately reciprocating the paddles comprising a vertically extending rotating shaft having individual lever means operatively engageable with respective paddles for reciprocating said paddles.

20. The crop harvesting machine of claim 18 including
a. means adjusting the angularity of said paddles across said opening,
b. and means adjusting the length of reciprocating movement of said paddles.

* * * * *